United States Patent [19]
Dole et al.

[11] Patent Number: 5,116,559
[45] Date of Patent: May 26, 1992

[54] METHOD OF FORMING YTTRIA-GADOLINIA CERAMIC SCINTILLATOR USING HYDROXIDE COPRECIPITATION STEP

[75] Inventors: Stephen L. Dole, Burnt Hills; Subramaniam Venkataramani, Clifton Park, both of N.Y.

[73] Assignee: General Electric Company, Schenectady, N.Y.

[21] Appl. No.: 660,462

[22] Filed: Feb. 26, 1991

[51] Int. Cl.$^5$ .............................................. C04B 35/50
[52] U.S. Cl. .................................... 264/65; 264/1.2; 252/301.4 R
[58] Field of Search .................. 264/1.2, 65; 252/301.4 R

[56] References Cited

U.S. PATENT DOCUMENTS

| | | |
|---|---|---|
| 4,421,671 | 12/1983 | Cusano et al. |
| 4,466,929 | 8/1984 | Greskovich et al. |
| 4,466,930 | 8/1984 | Greskovich et al. |
| 4,518,545 | 5/1985 | Cusano et al. |
| 4,525,628 | 6/1985 | DiBianca et al. |
| 4,747,973 | 5/1988 | Cusano et al. |
| 4,755,492 | 7/1988 | Greskovich ............ 264/1.2 |
| 5,021,376 | 6/1991 | Nienburg ............... 264/86 |

*Primary Examiner*—James Derrington
*Attorney, Agent, or Firm*—James E. McGinness; James C. Davis, Jr.; James Magee, Jr.

[57] ABSTRACT

A simplified method of forming polycrystalline translucent-to-transparent yttria-gadolinia composition scintillators comprises forming an aqueous suspension of hydroxide coprecipitates of the yttria-gadolinia composition, and converting the hydroxides to oxalates. The oxalates are neutralized by washing, dried, and granulated to form a finely dispersed oxalate powder. The oxalate powder is calcined, cold pressed to form a compact, and sintered in a reducing atmosphere or vacuum to form the polycrystalline translucent-to-transparent yttria-gadolinia composition scintillator.

8 Claims, No Drawings

METHOD OF FORMING YTTRIA-GADOLINIA CERAMIC SCINTILLATOR USING HYDROXIDE COPRECIPITATION STEP

This application is related to copending application Ser. No. 07/657,032, filed Sept. 19, 1991, and Ser. No. 07/673,608, filed Mar. 22, 1991.

The present invention is related to a method of forming rare earth oxide ceramic scintillators for computerized tomography (CT) and other x-ray, gamma radiation, and nuclear radiation detecting applications. More specifically the method relates to forming polycrystalline translucent-to-transparent yttria-gadolinia scintillators.

BACKGROUND OF THE INVENTION

Computerized tomography scanners are medical diagnostic instruments in which the subject is exposed to a relatively planar beam or beams of x-ray radiation, the intensity of which varies in direct relationship to the energy absorption along a plurality of subject body paths. By measuring the x-ray intensity (i.e., the x-ray absorption) along these paths from a plurality of different angles or views, an x-ray absorption coefficient can be computed for various areas in any plane of the body through which the radiation passes. These areas typically comprise approximately a square portion of about 1 mm $\times$ 1 mm. The absorption coefficients are used to produce a display of, for example, the bodily organs or structural members of industrial equipment intersected by the x-ray beam.

An integral and important part of the scanner is the x-ray detector which receives the x-ray radiation which has been modulated by passage through the particular body under study. Generally, the x-ray detector contains a scintillator material which, when excited by the impinging x-ray radiation, emits optical wavelength radiation. In typical medical or industrial applications, the optical output from the scintillator material is made to impinge upon photoelectrically responsive materials in order to produce electrical output signals, the amplitude of which is directly related to the intensity of the impinging x-ray radiation. The electrical signals are digitized for processing by digital computer means which generates the absorption coefficients in a form suitable for display on a cathode ray tube screen or other permanent media.

Due to the specific and demanding computerized tomography requirements, not all scintillator materials which emit optical radiation upon excitation by x-ray or gamma ray radiation are suitable for computerized tomography applications. Useful scintillators must be efficient converters of x-ray radiation into optical radiation in those regions of the electromagnetic spectrum (visible and near visible) which are most efficiently detected by photosensors such as photomultipliers or photodiodes. It is also desirable that the scintillator have a high optical clarity, i.e., transmit the optical radiation efficiently to avoid optical trapping, such that optical radiation originating deep in the scintillator body escapes for detection by externally situated photodetectors. This is particularly important in medical diagnostic applications where it is desirable that x-ray dosage be as small as possible to minimize patient exposure, while maintaining adequate quantum detection efficiency and a high signal-to-noise ratio.

Among other desirable scintillator material properties are short afterglow or persistence, low hysteresis, high x-ray stopping power, and spectral linearity. Afterglow is the tendency of the scintillator to continue emitting optical radiation for a time after termination of x-ray excitation, resulting in blurring, with time, of the information-bearing signal. Short afterglow is highly desirable in applications requiring rapid sequential scanning such as, for example, in imaging moving bodily organs. Hysteresis is the scintillator material property whereby the optical output varies for identical x-ray excitation based on the radiation history of the scintillator. Hysteresis is undesirable due to the requirement in computerized tomography for repeated precise measurements of optical output from each scintillator cell and where the optical output must be substantially identical for identical x-ray radiation exposure impinging on the scintillator body. Typical detecting accuracies are on the order of one part in one thousand for a number of successive measurements taken at relatively high rate. High x-ray stopping power is desirable for efficient x-ray detection. X-rays not absorbed by the scintillator escape detection. Spectral linearity is another important scintillator material property because x-rays impinging thereon have different frequencies. Scintillator response must be substantially uniform at all x-ray frequencies.

Compositions and methods of forming polycrystalline, rare earth oxide, ceramic scintillators having high optical clarity, density, uniformity, cubic structure, and useful in computerized tomography scanners, are disclosed in U.S. Pat. Nos. 4,421,671, 4,518,545, 4,525,628, 4,466,929, 4,466,930, and 4,747,973, incorporated herein by reference. Briefly described, the polycrystalline ceramic scintillators are formed of a rare earth oxide selected from the group consisting of $Gd_2O_3$, $Y_2O_3$, $La_2O_3$, $Lu_2O_3$, and mixtures thereof that form a cubic crystal structure. The rare earth oxide is doped with a rare earth activator such as europium, neodymium, ytterbium, dysprosium, terbium, and praseodymium to form the cubic crystal structure which scintillates at a predetermined wave length. Optionally, transparency promoters such as $ThO_2$, $ZrO_2$, and $Ta_2O_5$ can be added in an amount sufficient to improve the transparency of the ceramic scintillator, and a light output restorer such as CaO or SrO in an amount sufficient to effect a higher light output.

An important step in forming the rare earth oxide ceramic scintillators is the preparation of a suitable powder containing the desired scintillator material constituents. Suitable powders have submicron-to-micron powder particles, and are, for example, 99.99% to 99.9999% pure. Powder particle size is submicron-to-micron to provide high optical clarity, larger particle size results in higher porosity and loss of optical clarity when the powder is sintered to form the scintillator body. A known method for forming the desired starting powder employs a wet chemical oxalate precipitation process. The selected molar percentages of the nitrates of yttrium, gadolinium, europium, niobium, ytterbium, dysprosium, terbium, and praseodymium, are dissolved in water. The aqueous nitrate solution of the desired scintillator material constituents is admixed with a solution of oxalic acid which is, for example, 80% saturated at room temperature. The resulting coprecipitated oxalates are washed, neutralized, filtered, and dryed in air at about 100° C. for approximately 8 hours. The oxalates are then calcined, thermally decomposed, in air at approximately 700° C. to about 900° C. for a time ranging from one to four hours to form the corresponding oxides. Typically, heating for one hour at 800° C. is sufficient. Preferably, the oxalates or the resulting oxides are milled by one of several methods such as ball, colloid, or fluid energy milling to enhance optical clarity when the powder is sintered to form the scintillator.

Selected amounts of the powder composition are formed into powder compacts by either die pressing, or die pressing followed by isostatic pressing to further increase green density. The compact is densified by sintering, sintering plus gas hot isostatic pressing, or ceramic hot pressing methods. In the known methods for forming the rare earth ceramic scintillator materials described above, optical clarity is most improved in the sintered scintillators formed from milled oxalate or oxide powders.

It is an object of this invention to provide a simplified method for forming high optical clarity yttria-gadolinia ceramic scintillators without performing the step of milling the oxalate or oxide powders.

It is another object of this invention to form finely divided yttria-gadolinia ceramic scintillator powders by a wet chemical method where hydroxide coprecipitates are formed, followed by conversion of the hydroxides to oxalates.

The terms "transparency" and "translucency", as used herein, describe various degrees of optical clarity in the scintillator material. Typically, the inventive scintillator materials exhibit an optical attenuation coefficient of less than 100 cm$^{-1}$, as measured by standard spectral transmittance tests (i.e., "narrow" angle transmission) on a polished scintillator material plate, at the luminescent wavelength of the respective ion. The most desirable scintillator materials have lower attenuation coefficients and hence higher optical clarity, i.e., higher transparency.

BRIEF DESCRIPTION OF THE INVENTION

We have discovered a simplified method of forming high optical clarity yttria-gadolinia ceramic scintillators. The high optical clarity obtained in scintillators made by known methods using milled oxalate powders, is obtained in scintillators formed by the the method of this invention without the need for milling the oxalate powder.

The method of this invention for forming the polycrystalline translucent-to-transparent yttria-gadolinia composition scintillators comprises forming an aqueous suspension of hydroxide coprecipitates of the yttria-gadolinia composition by a wet ammonium hydroxide process. The hydroxide suspension is agitated while admixing oxalic acid in an effective amount to convert the hydroxides to oxalates, forming an aqueous suspension of oxalates. The oxalates are neutralized by washing, dried, and granulated to form a finely dispersed oxalate powder. The oxalate powder is calcined, thermally decomposed, in air to substantially fully oxidize the oxalates and form a finely divided oxide powder of the yttria-gadolinia composition. The oxide powder is cold pressed to form a compact, and the compact is sintered in a reducing atmosphere or vacuum to form the polycrystalline translucent-to-transparent yttria-gadolinia composition scintillator.

DETAILED DESCRIPTION OF THE INVENTION

We have discovered that by forming hydroxide coprecipitates of the yttria-gadolinia composition, and converting the hydroxides to oxalates, a more finely divided coprecipitated oxalate is produced as compared to the oxalate coprecipitates formed by known methods. As a result oxalate particle size is reduced, and yields a more finely divided oxide powder that sinters to higher optical clarity. In fact, the optical clarity of yttria-gadolinia scintillators produced by the method of this invention is comparable to the optical clarity of yttria-gadolinia scintillators formed from milled oxalate or oxide powders in prior known methods. As a result, the higher optical clarity yttria-gadolinia scintillators can be formed without the need of milling oxalate or oxide powders prior to calcining or sintering respectively.

The yttria-gadolinia composition scintillators of this invention are comprised of oxides of yttrium and gadolinium, and trivalent rare earth activator oxides. More specifically, the yttria-gadolinia composition scintillators are comprised of, in mole percent; about 5 to 50 percent $Gd_2O_3$, about 0.02 to 12 percent of a rare earth activator such as europium, neodymium, ytterbium, dysprosium, terbium, and praseodymium, and the remainder $Y_2O_3$ Materials containing less than about 5 mole percent $Gd_2O_3$ exhibit low x-ray stopping power for most practical detector design, while materials having more than 50 mole percent are increasingly non-cubic and exhibit poor optical clarity. The oxides of trivalent rare earth elements such as europium, neodymium, ytterbium, dysprosium, terbium, and praseodymium, are added to the basic yttria-gadolinia system as activators to enhance scintillator efficiency. Although not meant to be a complete list, examples of preferred compositions of the yttria-gadolinia composition scintillators are as follows: about 25 to 30 mole percent $Gd_2O_3$, about 1 to 6 mole percent $Eu_2O_3$, and the remainder $Y_2O_3$; about 30 mole percent $Gd_2O_3$, about 0.25 mole percent $Nb_2O_3$, and the remainder $Y_2O_3$; about 40 mole percent $Gd_2O_3$, about 0.15 mole percent $Tb_2O_3$, and the remainder $Y_2O_3$; about 40 mole percent $Gd_2O_3$, about 0.2 mole percent $Dy_2O_3$, and the remainder $Y_2O_3$.

The yttria-gadolinia compositions described above provide a cubic crystalline phase characterized by a high degree of scintillator material structural symmetry. Materials having such structure are particularly desirable for CT applications. Scintillator materials having increasing amounts of non-cubic phase, such as monoclinic phase, are characterized by lower relative light outputs and poor optical clarity due to grain boundary cracking and non-uniform crystalline structure. Materials having such non-cubic structure exhibit appreciable light scattering and reabsorbtion due to a longer effective relative path length for light transmission, thereby decreasing the amount of light available for detection by external photosensors.

Certain additives are useful in the yttria-gadolinia scintillator system to reduce undesirable scintillator material luminescent afterglow, which may lead to undesirable distortion and the presence of artifacts in reconstructed images. Additions of about 0.15 to 0.7 mole percent Yb203, about 0.1 to 2 mole percent SrO, and about 0.1 to 2 mole percent CaO are useful as an afterglow reducer. Powders of the aforedescribed yttria-gadolinia composition scintillators may be formed into scintillators by sintering, sintering plus hot isostatic pressing, and ceramic hot pressing methods. However, prior to the fabrication of the ceramic scintillator a suitable powder containing the desired scintillator material constituents must be formed.

In the method of this invention, powders of the yttria-gadolinia composition scintillators are prepared by wet chemical methods. In a wet ammonium hydroxide process, the selected molar percentages of nitrates or chlorides of yttrium, gadolinium, europium, neodymium, ytterbium, dysprosium, terbium, praseodymium and strontium, are dissolved in water, or, the respective oxides are dissolved in an aqueous nitric or hydrochloric acid solution, to from a dissolved rare earth solution. The dissolved rare earth solution can be filtered to remove insoluble matter, and diluted with distilled water to about 0.1 to 0.2 molar. The dissolved rare earth solution is agitated while adding an ammonium hydroxide solution having sufficient concentration to raise the pH to 8 or more. As used herein, the term "ammonium hydroxide solution" means an aqueous solution of ammonium hydroxide or an organic ammonium hydroxide compound, such as tetramethyl ammonium hydroxide, having a pH of 8 or more. Agitation can be by any of the known means that do not contaminate the suspension, for example, magnetic stirring, ultrasonic agitation, or mechanical vibration, i.e., shaking. An aqueous suspension of rare earth hydroxides is formed, and ammonium salts are formed as by-products of the hydroxide coprecipitation. The mixture is stirred until substantially all of the dissolved rare earth has coprecipitated as a hydroxide, for example about 30 minutes.

The aqueous suspension of hydroxides is agitated, as described above, while admixing oxalic acid in an effective amount to convert the hydroxides to oxalates. It has been found that about 1.5 moles of oxalic acid per mole of rare earth ion is suitable, and preferably oxalic acid is added in an amount sufficient to lower the pH to 3 or less in the aqueous suspension. The resulting oxalates are washed, neutralized, and filtered, to remove excess oxalic acid and ammonium salt by-products. Preferably, the oxalates are washed with distilled water until the the pH of the water after washing is the about same as the water before washing. It is still further preferred that the pH of the water not exceed 7 during washing. The filtered oxalates can be dried in air at about 75° to 125° C. for approximately 8 hours. Such drying forms a friable cake that can be granulated by pressing the friable cake through a nylon screen, for example, about 20 mesh.

Precipitation of the hydroxides, followed by precipitation of the oxalates provides a reduced particle size in the yttria-gadolinia oxalate powder. The particle size of the yttria-gadolinia powder formed by the method of this invention approaches the size achieved after milling in the prior known methods, for example, an oxalate particle size of 5 microns or less can be formed. As a result, milling is not required to achieve a comparable high optical clarity in sintered scintillators formed from powder produced by the method of this invention. However, milling and screening of the oxalates can be performed in the method of this invention to achieve further improved optical clarity in the sintered scintillators. For example, improved optical clarity is achieved by dry or wet screening of oxalate powders through fine mesh, for example 100 to 325 mesh, nylon screens. Milling is preferably of the type that does not contaminate the oxalate or oxide powders. For example, jet air milling, or high energy vibration milling with a rigid organic polymer milling media, or a metallic milling media such as steel balls coated with the rigid organic polymer. A suitable rigid organic polymer milling media has a hardness of about 40 Shore scale D Durometer hardness or greater, for example organic polymers such as polyamides including nylon, polyethylenes, acetyls, and polyesters.

The oxalate powder is calcined in air, i.e., thermally decomposed, at approximately 700° C. to about 900° C. for a time ranging from 1 to 4 hours to form the corresponding oxides. Typically, heating for 1 hour at 800°0 C. is sufficient. The oxide powder is formed into a compact by either die pressing or die pressing followed by isostatic pressing to further increase green density. A die material which is inert with respect to the scintillator constituents is preferred to avoid undesired reactions and contaminations. Suitable die materials include alumina, silicon carbide, and metals such as molybdenum, hardened steel, or nickel-based alloys. The powder compacts are formed by die pressing at pressures between about 3000 pounds per square inch, psi., and 15,000 psi. Alternatively, the die pressed powder compacts may be isostatically pressed at between 10,000 psi. and 60,000 psi. to further increase powder compact green density. If any grinding aids, compaction aids, or lubricants such as waxes, have been used, an oxidation treatment to remove all organic additives can be employed prior to sintering. The compacts are sintered in a high temperature furnace, for example having a tungsten heating element, in vacuum or a reducing atmosphere such as a wet hydrogen atmosphere, dew point of about 23° C. The compact is heated at a rate between approximately 100° C. per hour to 700° C. per hour to the sintering temperature of between 1800° C. and 2100° C., and held at the sintering temperature for about 1 to 30 hours to cause extensive densification and optical clarity development. After sintering, the compacts are cooled to room temperature over a period of time ranging from about 2 to 10 hours.

Sintered ceramic scintillators may also be prepared by a heating sequence which includes a hold at a temperature lower than the final sintering temperature. Typically, the powder compact is heated at a rate of between 300° C. and 400° C. per hour to a holding temperature of between 1600° C. and 1700° C. The holding period may range from about 1 to 20 10 hours, following which the temperature is raised to between about 1800° C. and 2100° C. for final sintering for between 1 and hours. The increase from the holding temperature to the final sintering temperature is at a rate of about 25° C. to 75° C. per hour. A preferred heating sequence comprises heating the powder compact to a holding temperature of about 1700° C. in 5 hours, holding at 1700° C. for 8 hours, followed by heating to 1910° C. in 4 hours, and sintering at 1910° C. for 2 hours.

The various features and advantages of the method of this invention are further shown by the following Examples.

EXAMPLE 1

A dissolved oxide solution comprised of about 50 grams of mixed oxides of about 67 mole percent yttrium oxide, 30 mole percent gadolinium oxide, and 3 mole percent europium oxide was formed by dissolving the oxides in about 200 grams of nitric acid and water to a final solution volume of 500 milliliters. The dissolved oxide solution was filtered and diluted to 3 liters with distilled water. A solution of 100 grams of concentrated ammonium hydroxide diluted to 500 milliliters with distilled water was dripped into the dissolved oxide solution while it was being stirred. The mixture was stirred for about thirty minutes, and an aqueous suspension of rare earth hydroxides was formed. The pH of the stirred mixture was about 9.0.

About 80 grams of oxalic acid dissolved in one liter of water was stirred into the hydroxide precipitates. After about one to two minutes, the pH stabilized in the mixture at about 2.1. The oxalic acid and hydroxide precipitate mixture was stirred for fifteen minutes, converting the hydroxide precipitates to oxalate precipitates. Four liters of distilled water was filtered through the oxalates, and the washed oxalates were dried for about three hours at 105° C. in air. The dried oxalate powder was granulated by pushing it through a coarse mesh nylon screen, and was calcined at 825° C. for two hours in air to form a finely divided yttria-gadolinia powder.

The oxide powder was pressed in a steel die to form a pellet. The pellet was isostatically pressed at sixty kips per square inch. The pressed pellet was heated in a flowing wet hydrogen atmosphere in a furnace equipped with a tungsten heating element according to the following heating schedule: heat up to 1700° C. in five hours, hold at 1700° C. for eight hours, heat up to 1910° C. in four hours, and hold at 1910° C. two hours to sinter the pellet. The optical transparency of the sintered pellet was measured in an in-line transmission test, for visible light, and had an in-line transmission of sixty-three percent per millimeter thickness, and an attenuation coefficient of 2.5.

EXAMPLE 2

A dissolved oxide solution was formed as described above in Example 1. An oxalic acid solution of 167 grams of oxalic acid dissolved in 3 liters of distilled water was stirred while slowly adding the dissolved oxide solution to form coprecipitates of the respective oxalates. The oxalate coprecipitates suspension was stirred until precipitation was complete, about 1 minute, and washed by stirring with about 16 liters of distilled water, allowing the oxalates to settle, and decanting the water. The washing and decanting procedure was repeated eight times. The washed oxalate coprecipitates were filtered to remove the liquid, dried several hours at 105° C. in air to form a friable cake, and granulated by pushing the cake through a 20 mesh nylon screen. The dried oxalate powder was calcined, pressed, and sintered according to the method in Example 1 to form the yttria-gadolinia scintillator. The optical clarity was measured and found to have less than 0.1% in-line transmission for 1 millimeter thickness, and an attenuation coefficient of about 70.

We claim:

1. A method of forming a polycrystalline translucent-to-transparent yttria-gadolinia composition scintillator that does not require milling, comprising:
   forming an aqueous suspension of hydroxide coprecipitates of the yttria-gadolinia composition by a wet ammonium hydroxide process;
   agitating the hydroxide suspension while admixing an effective amount of oxalic acid to convert the hydroxides to oxalates;
   calcining the oxalates to substantially fully oxidize the oxalates and form a powder of the yttriagadolinia scintillator composition;
   cold pressing the powder to form a compact; and
   sintering the compact in a reducing atmosphere or vacuum to form the polycrystalline translucent-to-transparent yttria-gadolinia composition scintillator.

2. The method of claim 1 wherein the step of forming an aqueous suspension of hydroxide coprecipitates comprises dissolving a mixture of oxides of the yttria-gadolinia composition in an aqueous hydrochloric or nitric acid solution, and agitating the acid solution while admixing an ammonium hydroxide solution to form the aqueous suspension, the ammonium hydroxide solution raising the pH to at least 7 in the aqueous suspension.

3. The method of claim 1 wherein agitating is performed until the pH of the oxalate suspension stabilizes.

4. The method of claim 3 wherein the oxalate precipitates are washed with water prior to the step of calcining.

5. The method of claim 4 wherein the water does not increase to a pH above 7 during washing.

6. The method of claim 5 further including the step of drying the oxalates at about 75° to 125° C. to a friable mass, and granulating the friable mass prior to the step of calcining.

7. The method of claim 6 wherein the step of calcining is preceded by the step of milling the oxalates.

8. The method of claim 7 wherein the step of milling is vibration milling with a rigid organic polymer milling media.

* * * * *